Patented Sept. 29, 1953

2,653,877

UNITED STATES PATENT OFFICE 2,653,877

MODIFIED CERAMIC ENAMEL

Alden J. Deyrup, Niagara Falls, N. Y., assignor to E. I. du Pont de Nemours and Company, Wilmington, Del., a corporation of Delaware No Drawing. Application June 13, 1950,
Serial No. 167,929

2 Claims. (Cl. 106—49)

1

This invention relates to a modifying material for a vitreous enamel and enamels containing the same. More particularly, it relates to a composition which when added to an enamel for light metals will greatly reduce any tendency of the enamel to "tear" and "crawl."

This is a continuation-in-part of my copending application Serial No. 87,343, filed April 13, 1949, now abandoned.

The "tearing" and "crawling" of enamels is a recognized problem in enameling with vitreous enamels, and consists in the breaking of the enamel film during firing, followed by contraction of the enamel sections between breaks. This may result in a few bare spots or in large bare areas with heavy enameled edges around the bare areas. This phenomenon generally occurs during the early part of the firing operation as the enamel approaches and passes through the sintering temperature.

"Tearing" and "crawling' of vitreous enamels used in the enameling of sheet steel is greatly minimized by addition of alkali metal (sodium or potassium) nitrites to the enamel.

Vitreous enamels suitable for the enameling of sheet steel are not satisfactory for the enameling of light metals such as aluminum, aluminum alloys, or magnesium. Recently, vitreous enamels suitable for the enameling of light metals were discovered. These enamels are described and claimed in U. S. Patent No. 2,467,114, issued April 12, 1949, and comprise:

10 to 18 mole percent PbO
38 to 65 mole percent $SiO_2$
5 to 12 mole percent $Li_2O$
0 to 22 mole percent $Na_2O$
0 to 20 mole percent $K_2O$, and
0 to 11 mole percent $TiO_2$ (for purposes of the present invention, the $TiO_2$ content may be as high as 20 mole percent), the total alkali metal oxide content $$(Li_2O+Na_2O+K_2O)$$

of the enamel composition being between 25 and 36 mole percent, and the ratio of the sum of said silica content and twice the said titanium oxide content of the composition to the said total alkali metal oxide content of the composition being between 1.8 and 3.0, all of the oxides being melted into the said enamel composition. If desired, said enamel may contain up to 10% by weight of ceramic pigment.

These new enamels have been used with great success in the enameling of light metals, particularly aluminum and aluminum alloys containing at least 80% of aluminum. As in the case of steel enamels, however, these enamels are subject to "tearing" and "crawling," particularly when the enamel layer is comparatively thick. Moreover, sodium or potassium nitrites, which when added to steel enamels will minimize "tearing" and "crawling," cannot be used with the new light-metal enamels since they cause profuse gas evolution as evidenced by frothing and blistering during the fusing of this enamel.

The use of the above-said light metal enamels has also shown up a hitherto unknown form of tearing, hereinafter to be referred to as "micro-tearing." "Micro-tearing" appears first as numerous tiny cracks in the unfired enamel just below the sintering temperature. These tiny cracks divide the enamel into many tiny islands, usually from ⅓ to 3 mm. in diameter. As the temperature increases, these islands separate further as their edges round off, and later start to flow together, but do not level out completely. Although "micro-tearing" is believed to be similar to ordinary "tearing," instances have been found where reduction or elimination of ordinary "tearing" induced aggravated "micro-tearing."

It is an object of this invention to provide a composition which may be added to the above-said light-metal vitreous enamels to reduce the tendency of said enamels to "tear," "crawl," or "micro-tear."

It is another object of this invention to produce a light-metal vitreous enamel having a reduced tendency to "tear," "crawl," or "micro-tear."

It is still another object of this invention to provide a process for reducing the tendency to "tear," "crawl," or "micro-tear" of the above-described light-metal vitreous enamels.

Other objects of the invention will appear hereinafter.

The objects of this invention may be accomplished by thoroughly mixing with the above-described light-metal enamel, alkali metal silicate and alkali metal metaborate in such a ratio that the mixture contains 1% to 10%, by weight of the enamel, of an alkali metal silicate-alkali metal metaborate mixture consisting of 10% to 30% $SiO_2$
20% to 40% $B_2O_3$, and
30% to 60% $Na_2O$ or $K_2O$ Any method of obtaining the above constituents in a soluble form in the enamel slip may be employed. The $Na_2O$ and $SiO_2$ may, for example, be added as commercial water glass containing approximately 37% of a water-soluble sodium silicate having an empirical composition of about $Na_2O \cdot 4SiO_2$ and 63% water. However, any form of sodium silicate which will yield the desired concentration of soluble $SiO_2$ is satisfactory. The metaborate, which has been found to be outstandingly superior for the purposes of this invention to other forms of boron may be added as such but is more conveniently formed in situ by adding boric acid or sodium tetraborate (borax) and sodium or potassium hydroxide. Sufficient alkali metal hydroxide is used to obtain the desired alkali metal oxide equivalent and assure the presence of metaborate.

If desired, the alkali metal metaborate and sodium silicate may be mixed with each other in the proportions in which they are to be contained in the enamel, and then together added to the enamel frit prior to the grinding thereof. In the event that other mill addition agents are to be added to the enamel frit, for example, ceramic pigments, dispersing agents, bonding agents, and the like, these substances may be premixed in suitable proportions with the alkali metal metaborate and sodium silicate.

The soluble alkali metal borates and silicates may be mixed with each other, with alkali metal hydroxide also, if necessary, in proportions to produce a mixture in which the silica, boric oxide, and alkali metal oxides are in the proportions of 10% to 30% $SiO_2$
20% to 40% $B_2O_3$ and
30% to 60% $Na_2O$ or $K_2O$.

If desired, materials yielding these proportions may be mixed with water in a convenient ratio, such as 20% to 70% of solids to 80% to 30% of water.

Smaller amounts than the lower limits of the above ranges of $SiO_2$, $B_2O_3$, and alkali metal oxide (based on the weight of the enamel frit) do not produce a sufficient anti-tearing effect, and larger amounts than the upper limits of said ranges may produce an inferior enamel, for example, an enamel having a reduced acid resistance.

The following examples are given to illustrate certain preferred anti-tearing compositions and enamels containing the same, it being understood that the invention is not to be limited in scope to the specific details of the examples.

*Example I*

To 20 parts potassium hydroxide are added 22 parts boric acid ($H_3BO_3$), 43 parts of white lead ($2PbCO_3 \cdot Pb(OH)_2$), and 15 parts of aqueous water-glass solution containing 63% water and 37% $Na_2O \cdot 4SiO_2$. The ingredients are thoroughly mixed and added in the proportion of one part of the mixture to 19 parts of the following enamel frit:

| | Percent by weight |
|---|---|
| PbO | 44.6 |
| $SiO_2$ | 29.6 |
| $Li_2O$ | 2.3 |
| $Na_2O$ | 13.3 |
| $TiO_2$ | 10.2 | and 0 to 1.9 parts of an inorganic pigment or opacifier.

The mass is thoroughly milled in a ball mill until a substantially homogeneous enamel is formed. Test pieces of aluminum or magnesium are sprayed with the above enamel and similar test pieces sprayed with an enamel prepared solely from an aqueous slurry of the above-described enamel frit and pigment or opacifier. The test pieces are dried and fired at a firing temperature between 920° F. and 980° F. The test pieces containing the enamel prepared solely from the enamel frit and pigment or opacifier show material evidence of "tearing" and "crawling," whereas the other test pieces enameled with the enamel containing the metaborate and silicate are free from "tearing" and "crawling." In the above example, the white lead is added solely as a dispersing agent.

*Example II*

To 35.4 parts of potassium hydroxide are added 39 parts boric acid and 25.6 parts of a water-glass solution containing 63% water and 37% $Na_2O \cdot 3.4SiO_2$. The several parts are thoroughly mixed and added in the proportion of one part of the mixture to 12.5 parts of the following enamel frit:

| | Percent by weight |
|---|---|
| PbO | 37.4 |
| $SiO_2$ | 30.0 |
| $Li_2O$ | 2.3 |
| $Na_2O$ | 13.8 |
| $K_2O$ | 2.2 |
| $TiO_2$ | 12.7 |
| $Sb_2O_3$ | 1.6 | and 0.75 part of a colored inorganic glass pigment such as lead antimonate.

The mass is thoroughly milled in a ball mill until homogeneous. Test pieces of aluminum or magnesium are sprayed with the above enamel mixture and similar test pieces sprayed with an enamel prepared solely from an aqueous slurry of the above-described enamel frit and pigment. The test pieces are dried and fired at a firing temperature between 920° F. and 980° F. The test pieces containing the enamel prepared solely from the enamel frit and pigment show considerable evidence of "tearing" and "micro-tearing," whereas the other test pieces enameled with the enamel containing the metaborate and silicate are free from "tearing" and "micro-tearing."

*Example III*

To 4.7 parts sodium hydroxide are added 22.2 parts borax ($Na_2B_4O_7 \cdot 10H_2O$), 47 parts of a water-glass solution containing 63% water and 37% $Na_2O \cdot 3.4SiO_2$, and 26.1 parts water. These materials are thoroughly mixed and added in the proportion of one part of the mixture to four parts of the following enamel frit:

| | Percent by weight |
|---|---|
| PbO | 34.2 |
| $SiO_2$ | 27.8 |
| $Li_2O$ | 2.4 |
| $Na_2O$ | 13.9 |
| $K_2O$ | 2.8 |
| $TiO_2$ | 13.7 |
| $Sb_2O_3$ | 2.8 |
| BaO | 2.4 | and 0.4 part of a colored inorganic pigment or opacifier such as $TiO_2$.

The mass is thoroughly milled in a ball mill until homogeneous. Test pieces of aluminum or magnesium are sprayed with the above enamel mixture and similar test pieces sprayed with an enamel prepared solely from an aqueous slurry of the above-described enamel frit and pigment or opacifier. The test pieces are dried and fired at a firing temperature between 920° F. and 980° F. The test pieces containing the enamel prepared solely from the enamel frit and pigment or opacifier show considerable evidence of "tearing" and "micro-tearing," whereas the other test pieces enameled with the enamel containing the metaborate and silicate are free from such defects.

Reference in the specification and claims to parts, proportions and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

I claim:

1. A vitreous enamel composition, suitable for the enameling of light metals comprising as an enamel frit:

10 to 18 mole percent PbO
38 to 65 mole percent $SiO_2$
5 to 12 mole percent $Li_2O$ at least one of the group consisting of $Na_2O$ and $K_2O$ in amounts as follows:

up to 22 mole percent $Na_2O$
up to 20 mole percent $K_2O$, and from traces up to 20 mole percent $TiO_2$ the total alkali metal oxide content $(Li_2O+Na_2O+K_2O)$ of the enamel composition being between 25 and 36 mole percent, and the ratio of the sum of said silica content and twice the said titanium oxide content of the composition to the said total alkali metal oxide content of the composition being between 1.8 and 3.0, all of the said oxide being melted into said enamel composition, and mixed therewith as agents to reduce "tearing" of said enamel during firing alkali metal silicate and alkali metal metaborate, taken from the class consisting of sodium and potassium in such a ratio that the mixture contains 1% to 10% by weight of the enamel frit of an alkali metal silicate-alkali metal metaborate mixture consisting of 10%–30% $SiO_2$, 20%–40% $B_2O_3$, and 30%–60% alkali metal oxide.

2. The method of preparing a vitreous enamel composition having a reduced tendency to "tear" which comprises mixing with an enamel frit comprising:

10 to 18 mole percent PbO
38 to 65 mole percent $SiO_2$
5 to 12 mole mole percent $Li_2O$ at least one of the group consisting of $Na_2O$ and $K_2O$ in amounts as follows:

up to 22 mole percent $Na_2O$
up to 20 mole percent $K_2O$, and from traces up to 20 mole percent $TiO_2$ alkali metal silicate and alkali metal metaborate, taken from the class consisting of sodium and potassium in such a ratio that the mixture contains 1% to 10% by weight of the enamel frit of an alkali metal silicate-alkali metal metaborate mixture consisting of 10%–30% $SiO_2$, 20%–40% $B_2O_3$, and 30%–60% alkali metal oxide.

ALDEN J. DEYRUP.

References Cited in the file of this patent

UNITED STATES PATENTS

| Number | Name | Date |
|---|---|---|
| 2,467,114 | Deyrup | Apr. 12, 1949 |

FOREIGN PATENTS

| Number | Country | Date |
|---|---|---|
| 564,597 | Great Britain | 1944 |